H. W. PLEISTER.
EXPANSION BOLT ANCHOR.
APPLICATION FILED FEB. 8, 1912.
1,021,794.
Patented Apr. 2, 1912.
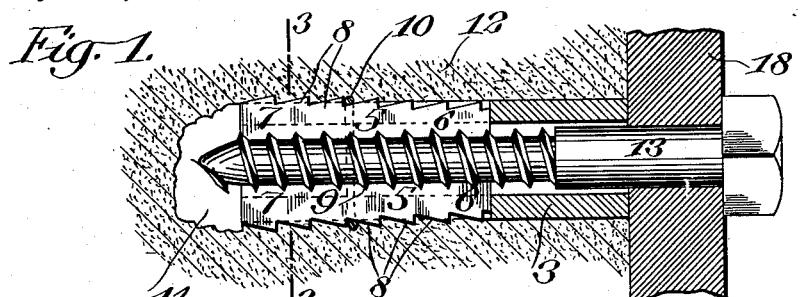
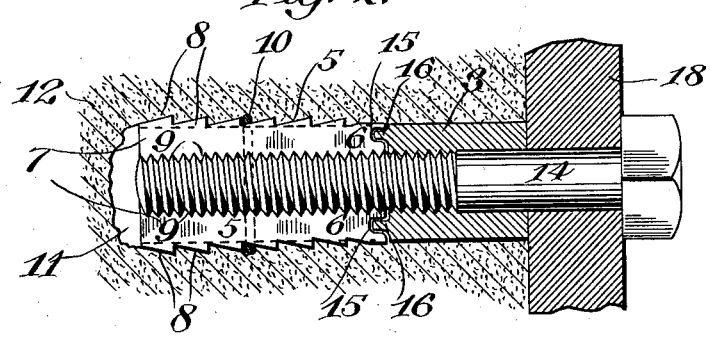
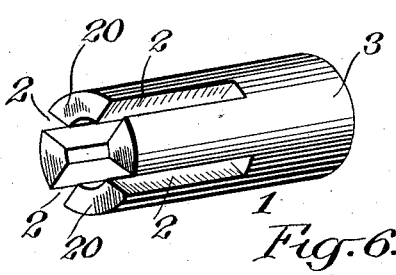
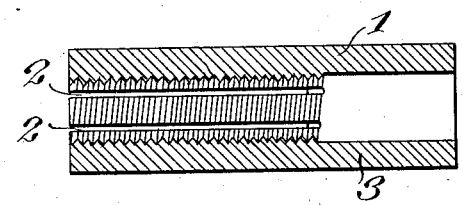
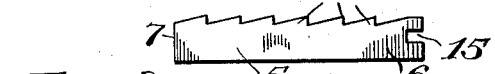
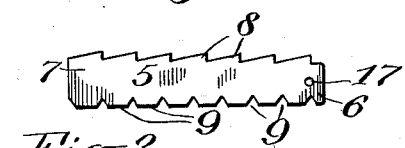
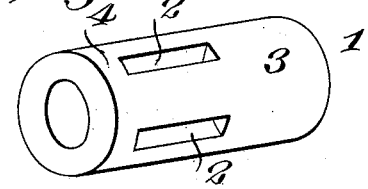
WITNESSES
INVENTOR
Henry W. Pleister
BY
Alan M. Johnson
ATTORNEY
COLUMBIA PLANOGRAPH CO., WASHINGTON, D. C.

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY.

EXPANSION-BOLT ANCHOR.

1,021,794.      Specification of Letters Patent.      Patented Apr. 2, 1912.

Application filed February 8, 1912. Serial No. 676,339.

*To all whom it may concern:*

Be it known that I, HENRY W. PLEISTER, a citizen of the United States, and a resident of Westfield, in the county of Union and State of New Jersey, have invented certain new and useful Improvements in Expansion-Bolt Anchors, (Case C,) of which the following is a specification, taken in connection with the accompanying drawings, which form a part of the same, this application being a copy of applicant's former abandoned application, Serial No. 411,141, filed January 16, 1908, and allowed March 22, 1909.

This invention relates to expansion bolt anchors wherein the gripping action is performed by radially movable members located in slots or recesses in the body or shell of the anchor.

In the accompanying drawings showing an illustrative embodiment of this invention and in which the same reference numerals refer to similar parts in the several figures,—Figure 1 is a longitudinal vertical section of my expansion bolt anchor, the expanders and lag screw being shown in side elevation; Fig. 2 is a longitudinal vertical section similar to Fig. 1 showing machine screw threads upon the bolt; Fig. 3 is a transverse vertical section upon line 3—3 of Fig. 1; Fig. 4 is a perspective view of the body portion or casing of my bolt anchor; Fig. 5 is a longitudinal vertical section of the body portion or casing, showing the same screw threaded; Fig. 6 is a side elevation of one of the expanders provided with teeth but not with screw threads; Fig. 7 is a side elevation of one of the expanders provided both with teeth and screw threads and also with an aperture for a pin to pivot the expander to the shell or body portion; and Fig. 8 is a perspective view of a modified form of the body portion.

In the illustrative embodiment of the invention shown in the drawings, 1 is the casing or body portion which may be made of pressed steel, forged or malleable iron or other metal, or may be cast from any suitable metal. Preferably, though not necessarily, I form this casing or body portion in the form of a hollow cylinder and, in any suitable manner, locate one or more slots 2, 2 within it, the slots extending from the exterior circumference of the cylinder to the hollow interior. These slots 2, 2 may extend entirely to one end of the body portion, as in Fig. 4, forming free arms 20, 20, or they may extend only part way, as in Fig. 8. I preferably form the body or casing with a continuous uninterrupted portion 3, which may be only at one end, as in Fig. 4, or I may have another uninterrupted portion 4, at the other end of the body portion, as shown in Fig. 8.

Within the slots 2, four being shown in Fig. 4, though one or any other number may be used, I mount expanders 5. These expanders are formed of any suitable material and are preferably, though not necessarily, formed tapering, the end 7 being of greater width than the end 6. The difference between the width of the two ends 6 and 7, or the taper, can be varied to increase or decrease the radial movement or throw of the expanders.

While the expanders 5 may be made of any suitable cast metal, I preferably punch them out of plate steel and at the same time form the teeth 8, 8 upon their outer surface and interrupted screw threads 9, 9 upon their inner surface, though both the teeth and screw threads may be omitted, the latter being omitted in Fig. 6. When the expanders 5, 5 are in their inoperative position within the casing or body portion 1, their outer surface, or teeth 8, 8 if they are provided with teeth, lie beneath the surface of the body portion, being preferably held in this collapsed position for shipment by an ordinary split spring ring 10, Fig. 1, or any other suitable means. In this collapsed position the body portion 1 and the expanders 5, 5 are placed within a hole 11, drilled or otherwise made in a masonry, brick, cement or other support 12 to hold the supported member 18. Upon the insertion of the lag screw 13, Fig. 1, or the machine bolt 14, Fig. 2, the expanders 5, 5 are forced out radially, the screw threads upon the lag screw or bolt coöperating with the complementary interrupted threads upon the expanders 5, 5 to obtain a powerful expanding action. In the preferred construction I do not form screw threads upon the interior of the casing or body portion, Fig. 4, though, if screw threads upon the body portion are desired, they may be used as shown in Fig. 5. In some cases I do not place screw threads upon the interior of the expanders 5, 5 Fig. 6. When the expanders are made of softer metal than the lag or machine screws, the screw threads on these elements will cut complementary screw threads upon the expanders. These expanders may be mounted loosely in the slots 2, 2 as shown in Fig. 1, or they may be pivoted, in any suitable manner, to the body portion, as shown for instance in Fig. 2. In this figure I form a recess 15 in the shorter end of the expander to fit over a reduced portion 16 of the interrupted portion 3. In Fig. 7 I have formed an aperture 17 in the end of the expander through which a pin or other suitable means may be placed to pivot the expander within the slots 2, 2 in any suitable manner.

If desired, the casing or body portion may be made of two or more parts but in such construction, and in this form of my invention, the expanding strain is upon the expanders and not upon the casing or body portion. I can therefore if, desired, use a casing of relatively light material formed by casting or otherwise.

Having thus described this invention in connection with an illustrative embodiment thereof, to the details of which I do not desire to be limited, what is claimed as new and what it is desired to secure by Letters Patent is set forth in the appended claims.

1. In combination with a substantially non-expansible body portion provided with one or more slots and free arms, one or more expanders mounted in the slots and carried by the body portion and adapted to move radially.

2. In combination in an expansion bolt anchor, a substantially non-expansible body portion provided with one or more slots and free arms, one or more expanders mounted in the slots, an open recess in one end of each expander, and means carried by the non-expansible body portion to coöperate with the open recess in each expander.

HENRY W. PLEISTER.

Witnesses:
C. M. Lyons,
A. M. Williams.

---

Copies of this patent may be obtained for five cents each, by addressing the "Commissioner of Patents, Washington, D. C."